United States Patent [19]

Kreitzer

[11] Patent Number: 4,900,139

[45] Date of Patent: Feb. 13, 1990

[54] COLOR CORRECTED PROJECTION LENS

[75] Inventor: Melvyn H. Kreitzer, Cincinnati, Ohio

[73] Assignee: U. S. Precision Lens, Inc., Cincinnati, Ohio

[21] Appl. No.: 266,234

[22] Filed: Oct. 28, 1988

Related U.S. Application Data

[63] Continuation of Ser. No. 48,026, May 11, 1987, abandoned.

[51] Int. Cl.[4] ........................ G02B 13/18; G02B 9/00; G02B 3/00

[52] U.S. Cl. .................................... 350/432; 350/463; 350/412

[58] Field of Search ................ 350/412, 432, 463, 465

[56] References Cited

U.S. PATENT DOCUMENTS

| | | | |
|---|---|---|---|
| 3,446,547 | 5/1969 | Jeffree | 350/465 |
| 4,620,773 | 11/1986 | Fukuda | 350/432 |
| 4,682,862 | 7/1987 | Moskovich | 350/432 |
| 4,776,681 | 10/1988 | Moskovich | 350/432 |
| 4,810,075 | 3/1989 | Fukuda | 350/432 |
| 4,824,224 | 4/1989 | Fukuda et al. | 350/432 |

FOREIGN PATENT DOCUMENTS

| | | | |
|---|---|---|---|
| 0198016 | 11/1983 | Japan | 350/432 |

*Primary Examiner*—Bruce Y. Arnold
*Assistant Examiner*—Ronald M. Kachmarik
*Attorney, Agent, or Firm*—Robert H. Montgomery

[57] ABSTRACT

A lens comprising from the image side a first lens unit which is a positive element with at least one aspheric surface; a three element lens unit consisting of a biconcave element, a biconvex element and another positive component, in that order; a third lens unit having a strongly concave image side surface and which serves as a field flattener and to correct the Petzval sum of the lens.

59 Claims, 2 Drawing Sheets

COLOR CORRECTED PROJECTION LENS

RELATED APPLICATION

This is a continuation of application Ser. No. 07/048,026 filed May 11, 1987 now abandoned.

FIELD OF THE INVENTION

This invention relates to projection lenses for cathode ray tubes and, more particularly, relates to such lenses which are color corrected.

BACKGROUND OF THE INVENTION

In projection television systems, it is common practice to utilize three cathode ray tubes (CRT's) of different colors, namely, red, blue and green. Utilizing three monochromatic CRT's does not require a color corrected lens for normal usage. Examples of such lenses are shown in U.S. Pat. Nos. 4,300,817, 4,348,081 and 4,526,442.

In practice, the phosphors of the three differently colored CRT's emit polychromatically with the green phosphor having significant side bands in blue and red. This chromatic spread can effect the image quality, particularly in situations where high resolution is of prime concern. Where there is to be a data display or large magnification, this color spread manifests itself as lowered image contrast and visible color fringing.

The degree of color correction required in the lenses for these applications depends on the intended application of the lenses.

In general, for lower resolution systems, such as for the projection of typical broadcast television, good color optical performance out to three cycles per millimeter as measured by the modulation transfer function (MTF) is adequate. In these cases, partial color correction may be adequate. For data display via red, green and blue inputs (RGB), and for high definition television, good performance out to ten cycles per millimeter, as measured by the MTF, may be required, and total color correction then becomes necessary.

The requirement for partial or total color correction always complicates an optical design problem. In projection television, it is of vital concern not to alleviate this difficulty by relaxing important system specification, such as field coverage, lens speed, and relative illumination. Additionally, it is often desirable that the lenses be capable of high performance over a significant range of magnifications. A typical front projection requirement might be from a magnification of 10× to 60×. This further complicates the optical design.

Accordingly, the present invention provides a new and improved projection lens for a cathode ray tube of high definition while maintaining a wide field angle and large relative aperture. The invention also provides a CRT projection lens that maintains a high level of image quality over a wide range of magnifications, for example, 10× to 60× or greater.

SUMMARY OF THE INVENTION

Briefly stated, a lens embodying the invention in one form thereof consists from the image side a first lens unit which is a positive element with at least one aspheric surface; a three element lens unit consisting of a biconcave element, a biconvex element and another positive component, in that order; a third lens unit having a strongly concave image side surface and which serves as a field flattener and to correct the Petzval sum of the lens; and a weak power corrector lens element having at least one aspheric surface that significantly improves the higher order sagittal flare aberration is positioned between the second and third lens units.

The first two elements of the second lens unit form a color correcting doublet of overall menicus shape concave to the image side.

An object of this invention is to provide a new and improved color corrected lens for cathode ray tube projection which provides enhanced image quality while maintaining a large relative aperture and wide field.

Another object of this invention is to provide a new and improved color corrected lens for cathode ray tube projection which maintains enhanced image quality thoughout a wide range of magnifications.

The features of the invention which are believed to be novel are particularly pointed out and distinctly claimed in the concluding portion of the specification. The invention, however, together with further objects and advantages thereof, may best be appreciated by reference to the following detailed description taken in conjunction with the drawings.

DETAILED DESCRIPTION OF PREFERRED EMBODIMENTS OF THE INVENTION

Figure 1:
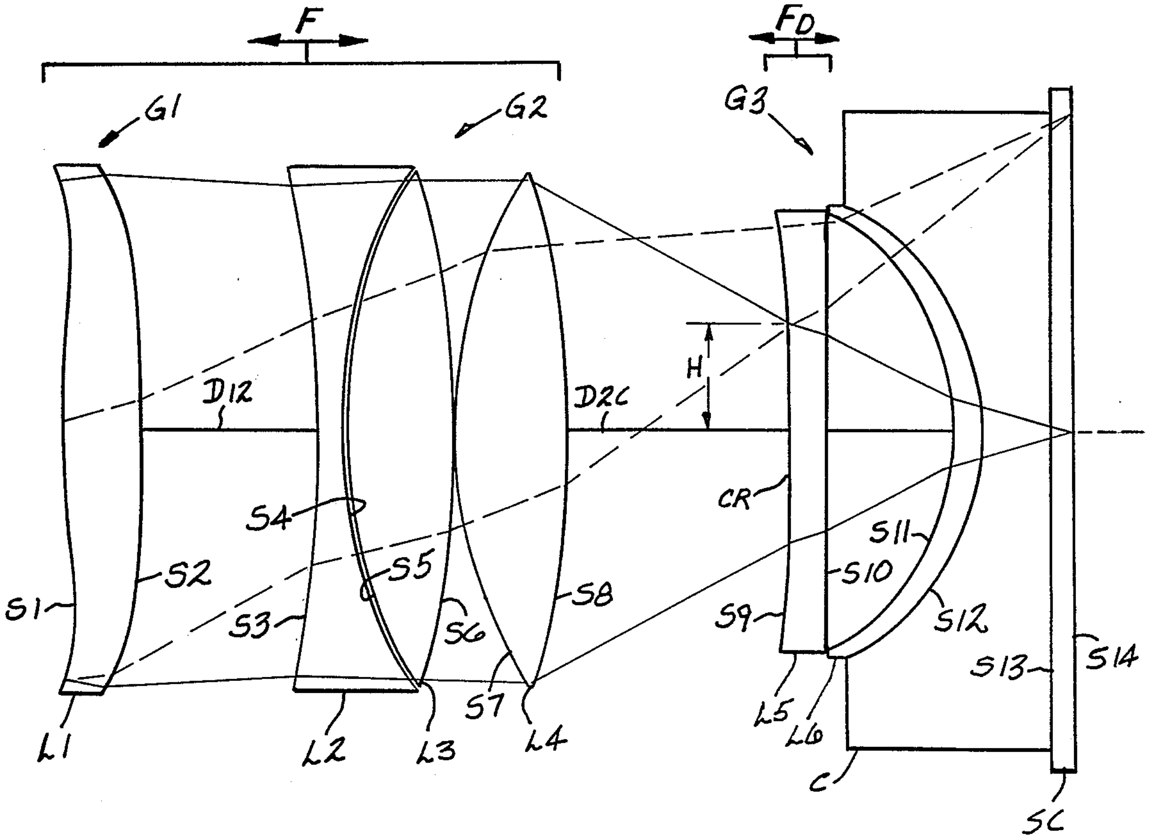
FIGS. 1–4 are schematic side elevations of lenses which may embody the invention.

Different projection lenses embodying the invention are set forth in Tables I–X and exemplified in the drawings.

Figure 2:
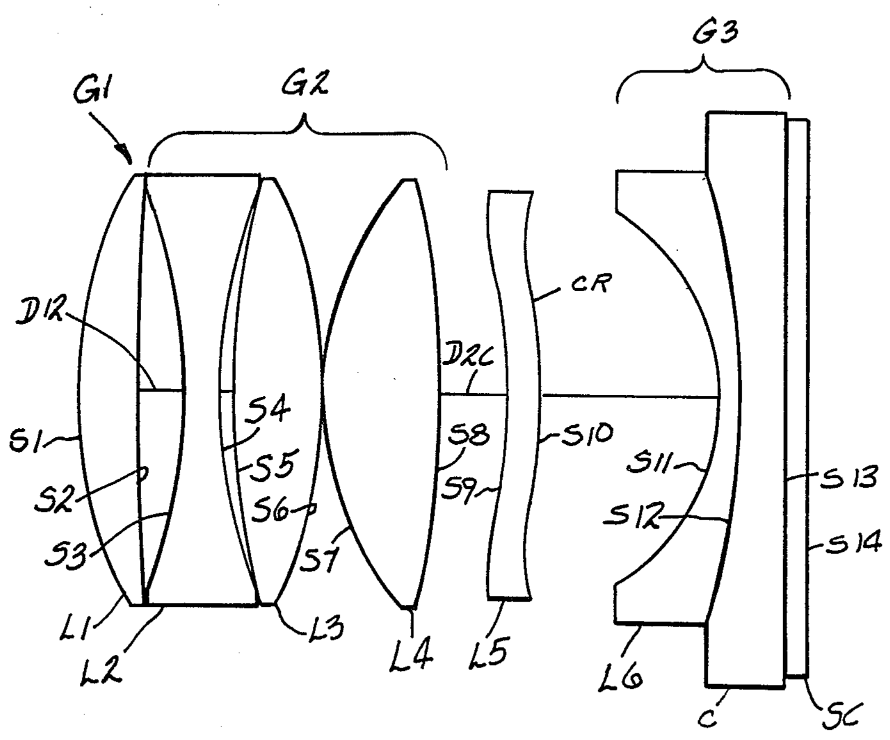

In the drawings, the lens units are identified by the reference G followed by successive arabic numerals, except that a corrector lens unit is designated by the reference CR; lens elements are identified by the reference L followed by successive arabic numerals from the image to the object end. Surfaces of the lens elements are identified by the reference S followed by successive arabic numerals from the image to the object end. The reference SC denotes the screen of a cathode ray tube, while the reference C denotes a liquid optical coupler between the screen SC and the overall lens. In the embodiments of FIGS. 1 and 2, the coupler C contributes optical power as hereinafter explained.

In all disclosed embodiments of the invention, the first lens unit G1 comprises an element L1 of positive power and has at least one aspheric surface defined by the equation:

$$x = \frac{Cy^2}{1 + [1 - (1 + K)C^2y^2]^{1/2}} + Dy^4 + Ey^6 + Fy^8 + Gy^{10} + Hy^{12} + Iy^{14}$$

where x is the surface sag at a semi-aperture distance y from the axis A of the lens, C is the curvature of a lens surface at the optical axis A equal to the reciprocal of the radius at the optical axis, K is a conic constant and D, E, F, G, H and I are aspheric coefficients of correspondingly fourth through fourteenth order.

Reference is now made to FIG. 1, which discloses a lens embodying the invention. The lens of FIG. 1 comprises three lens units, G1, G2, and G3, as seen from the image side or the projection screen (not shown). Lens unit G1 consists of a single element L1 having two aspheric surfaces. Lens unit G2 consists of a color correcting doublet L2 and L3 of weak total optical power which is closely spaced to a biconvex element L4. Lens unit G3 comprises an element having a concave image side surface, and a liquid coupler which optically couples the lens to the faceplate CS of a cathode ray tube. The construction of the coupler is disclosed and claimed in co-pending U.S. application Ser. No. 820,266 filed Jan. 17, 1986. The coupler C comprises a housing which defines a peripheral wall which is sealed against CRT faceplate CS. The housing has a window at the other side which is closed by a meniscus element L6 having a strongly concave image side surface. Lens unit G3 provides correction for field curvature and contributes to reduction of Petzval sum. Coupler C is filled with a liquid having an index of refraction close to the index of refraction of element L6 and the CRT faceplate. Thus, surface S12 of element L6 does not have to be highly finished. The material of element L6 may be a plastic material such as acrylic or, as specified in Table I, may be glass having spherical surfaces. Element L5 is a corrector, which is positioned between lens units G2 and G3 and as exemplified in Table I, has two aspheric surfaces.

Corrector element L5 is positioned with respect to lens unit G2 such that the marginal axial rays OA intersect surface S9 thereof at a height substantially less than the clear aperture of the lens, while allowing the dimension above the height H to be configured to correct for aberrations due to off-axis rays. In FIG. 1, the marginal axial rays AR are indicated in full line, while the off-axis rays OA are indicated in short broken line. The corrector element L5 is configured and spaced from lens unit G2 to permit the central portion thereof up to the height H to be utilized to aid in correction of aperture dependent aberrations and for this reason, L5 should be within a distance $D_{2C}/F_0$ where $D_{2C}$ is the axial spacing between lens unit G2 and corrector element L5, and $F_0$ is the equivalent focal length (EFL) of the lens.

In all cases, The corrector lens unit CR where used is shaped to contribute to correction of spherical aberration in the center and to contribute to correction of off-axis aberrations toward the ends. These off-axis aberrations are sagittal oblique spherical, coma and astigmatism.

Lenses as shown in FIG. 1 are described in the prescriptions of Tables I and II. The lens of Table III has the same form but is not optically coupled to the CRT screen SC.

Lenses as shown in FIG. 2 are described in the prescriptions of Tables IV, V, VI, VII and VIII. In the lenses of Tables VI and VII the coupler C has no optical power.

Figure 3:
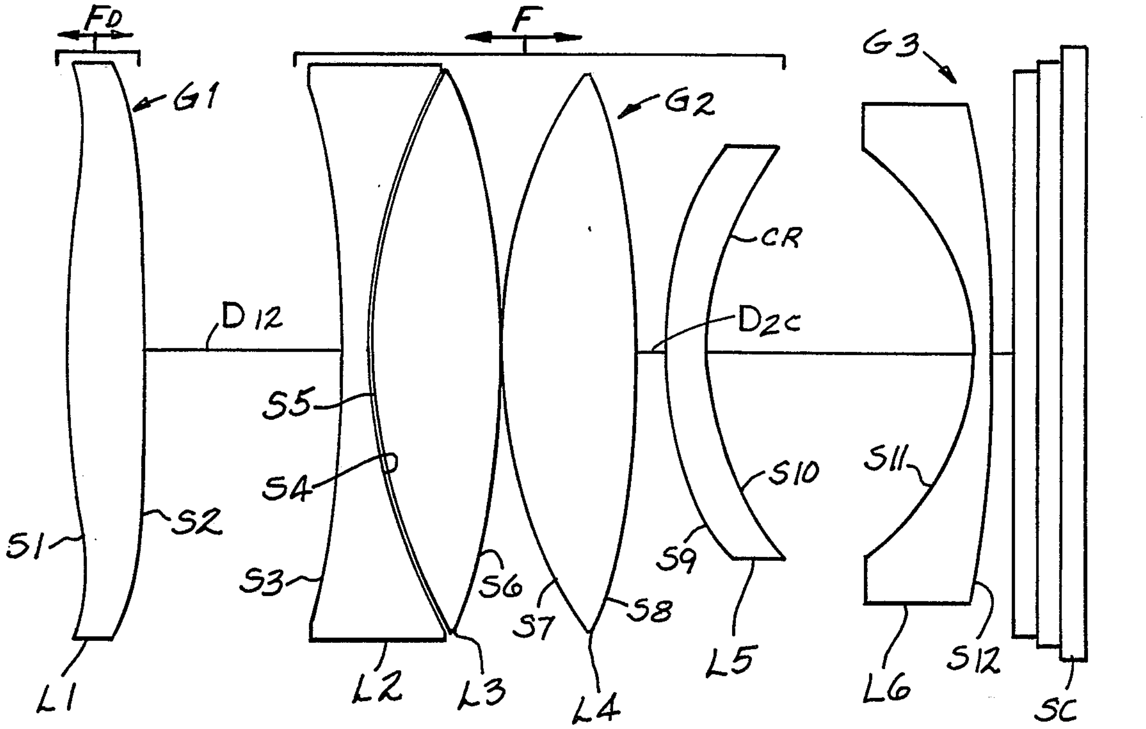

Lenses as shown in FIG. 3 are described in the prescriptions of Tables IX and X. These lenses are air spaced from the CRT screen SC. The screen SC is shown as comprising two outer plates with a coolant therebetween.

Figure 4:
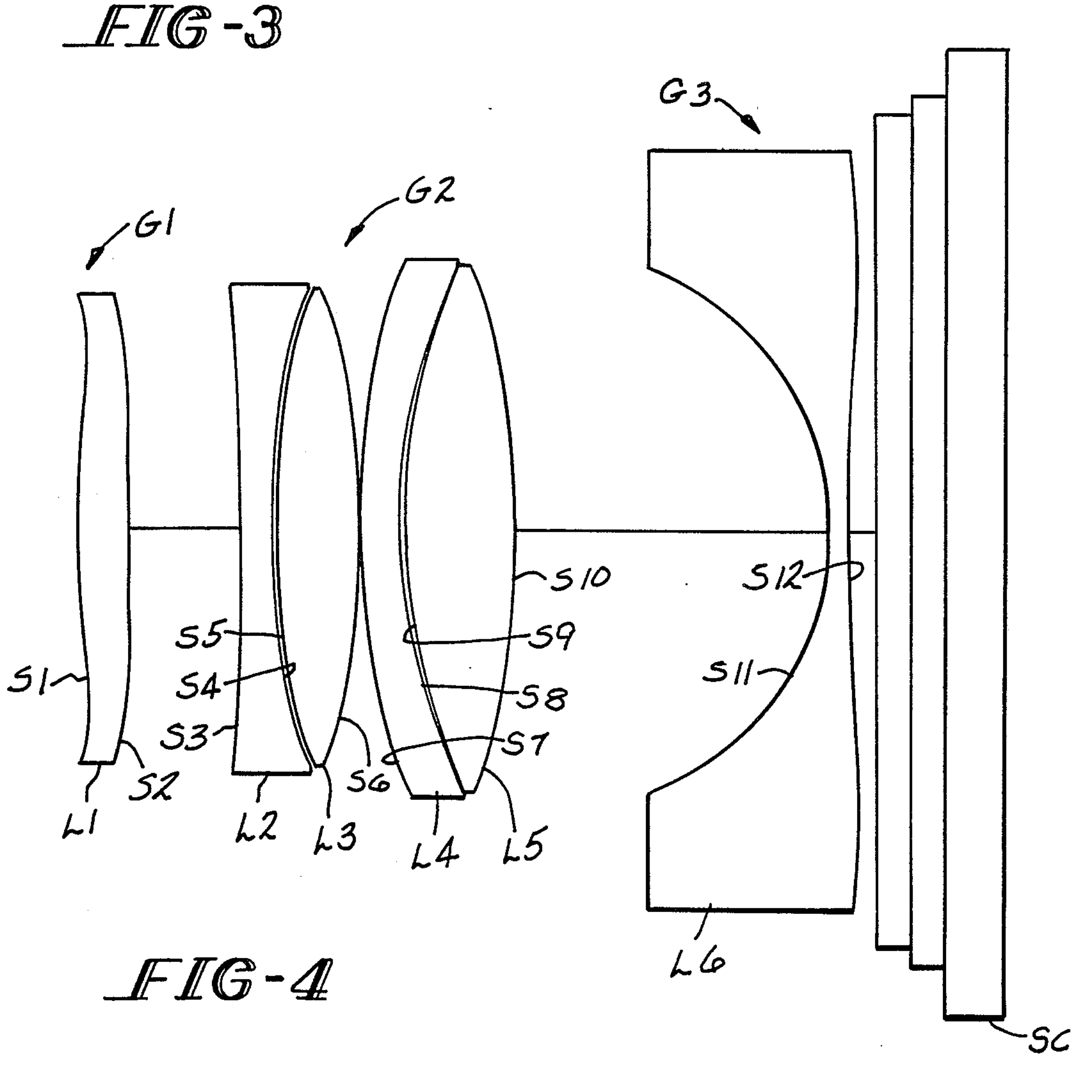

A lens as shown in FIG. 4 is described in the prescription of Table XI. Here, there is no corrector CR, and the second biconvex element of the second lens unit is split into two elements.

In the following tables, the lens elements are identified from the image end to the object end by the reference L followed successively by an arabic numeral. Lens surfaces are identified by the reference S followed by an arabic numeral successively from the image to the object end. The index of refraction of each lens element is given under the heading $N_D$. The dispersion of each lens element as measured by its Abbe number is given by $V_D$. EFL is the equivalent focal length of the lens and the semi-field angle is set forth. F/No. is the relative aperture of the lens, and the aperture stop is indicated in relation to a surface. The aspheric surfaces of the lens elements are in accordance with the coefficients set forth in the foregoing aspheric equation.

The following Tables also set forth the magnification (M) of the image as an inverse function of the object, and the diagonal of the CRT for which the lens is designed. The dimension for the diagonal is for the phosphor raster of the CRT screen. The raster may vary for different CRT's having a nominal diagonal.

TABLE I

| LENS | | SURFACE RADII (mm) | AXIAL DISTANCE BETWEEN SURFACES (mm) | $N_d$ | $V_d$ |
|---|---|---|---|---|---|
| | S1 | 283.871 | | | |
| L1 | | | 21.700 | 1.491 | 57.2 |
| | S2 | −1056.263 | | | |
| | | | 49.800 | | |
| | S3 | −329.768 | | | |
| L2 | | | 7.4000 | 1.673 | 32.17 |
| | S4 | 137.720 | | | |
| | | | 0.740 | | |
| | S5 | 142.596 | | | |
| L3 | | | 30.000 | 1.589 | 61.25 |
| | S6 | −277.752 | | | |
| | | | 0.250 | | |
| | S7 | 133.119 | | | |
| L4 | | | 32.400 | 1.517 | 64.17 |
| | S8 | −253.947 | | | |
| | | | 62.100 | | |
| | S9 | −1569.033 | | | |
| L5 | | | 10.000 | 1.491 | 57.2 |
| | S10 | 3665.023 | | | |
| | | | 36.420 | | |
| | S11 | −69.434 | | | |
| L6 | | | 8.000 | 1.517 | 64.17 |
| | S12 | −70.013 | | | |
| C | | | 18.000 | 1.410 | 55.0 |
| | S13 | Plano | | | |

f/No. = 1.2 CRT Diagonal = 161. mm
EFL = 169.6 mm Magnification = −.0609
Semi-field = 24° Aperture stop is 6.00 mm after S5
Aspheric Surfaces S1, S2, S9, S10

| | S1 | S2 | S9 |
|---|---|---|---|
| D | $-0.2310 \times 10^{-6}$ | $-0.1901 \times 10^{-6}$ | $-0.2135 \times 10^{-7}$ |
| E | $-0.3115 \times 10^{-10}$ | $-0.2372 \times 10^{-10}$ | $-0.3129 \times 10^{-10}$ |
| F | $0.1117 \times 10^{-14}$ | $0.1940 \times 10^{-14}$ | $-0.1604 \times 10^{-13}$ |
| G | $-0.4454 \times 10^{-18}$ | $-0.3978 \times 10^{-18}$ | $0.2514 \times 10^{-18}$ |
| H | $0.7641 \times 10^{-22}$ | $0.6081 \times 10^{-}$ | $0.2123 \times 10^{-20}$ |
| I | $-0.3878 \times 10^{-26}$ | $-0.3494 \times 10^{-26}$ | $-0.2994 \times 10^{-24}$ |

| | S10 |
|---|---|
| D | $0.1728 \times 10^{-6}$ |
| E | $-0.6890 \times 10^{-10}$ |
| F | $0.1558 \times 10^{-14}$ |
| G | $0.1647 \times 10^{-17}$ |
| H | $0.1056 \times 10^{-20}$ |
| I | $-0.1015 \times 10^{-24}$ |

TABLE II

| LENS | | SURFACE RADII(mm) | AXIAL DISTANCE BETWEEN SURFACE (mm) | $N_d$ | $V_d$ |
|---|---|---|---|---|---|
| | S1 | 195.212 | | | |
| L1 | | | 17.300 | 1.491 | 57.2 |
| | S2 | −1341.860 | | | |
| | | | 43.340 | | |
| | S3 | −255.343 | | | |
| L2 | | | 5.890 | 1.689 | 31.16 |

TABLE II-continued

| | | | | | |
|---|---|---|---|---|---|
| | S4 | 123.557 | | | |
| | | | 1.030 | | |
| | S5 | 131.041 | | | |
| L3 | | | 28.640 | 1.589 | 61.25 |
| | S6 | −177.990 | | | |
| | | | 0.200 | | |
| | S7 | 109.648 | | | |
| L4 | | | 30.280 | 1.517 | 64.20 |
| | S8 | −205.352 | | | |
| | | | D8 | | |
| | S9 | −127.299 | | | |
| L5 | | | 7.961 | 1.491 | 57.2 |
| | S10 | −211.498 | | | |
| | | | D10 | | |
| | S11 | −58.675 | | | |
| L6 | | | 6.000 | 1.526 | 60.03 |
| | S12 | −60.201 | | | |
| C | | | 7.000 | | |
| | S13 | Plano | | | |

f/No. = 1.1 CRT Diagonal = 124 mm
EFL = 135.0 mm Aperture stop is 0.00 mm after S5
Semi-field = 23°
Aspheric Surfaces S1, S2, S9, S10

| | S1 | S2 | S9 |
|---|---|---|---|
| D | $-0.3078 \times 10^{-6}$ | $-0.2154 \times 10^{-6}$ | $0.1118 \times 10^{-5}$ |
| E | $-0.8541 \times 10^{-10}$ | $-0.7388 \times 10^{-10}$ | $-0.2040 \times 10^{-9}$ |
| F | $0.4895 \times 10^{-14}$ | $0.8120 \times 10^{-14}$ | $-0.1373 \times 10^{-12}$ |
| G | $-0.4086 \times 10^{-17}$ | $-0.3506 \times 10^{-17}$ | $0.4412 \times 10^{-16}$ |
| H | $0.8618 \times 10^{-21}$ | $0.7248 \times 10^{-21}$ | $0.1932 \times 10^{-19}$ |
| I | $-0.6304 \times 10^{-25}$ | $-0.5796 \times 10^{-25}$ | $-0.7326 \times 10^{-23}$ |

| | | Focusing Data | | | |
|---|---|---|---|---|---|
| | S10 | EFL (mm) | D8 (mm) | D10 (mm) | M |
| D | $0.1483 \times 10^{-5}$ | | | | |
| E | $-0.3031 \times 10^{-9}$ | 130.3 | 44.87 | 39.69 | −.0992 |
| F | $-0.8927 \times 10^{-14}$ | 135.0 | 48.22 | 30.09 | −.0500 |
| G | $-0.3316 \times 10^{-16}$ | 138.2 | 51.78 | 22.12 | −.0165 |
| H | $0.3663 \times 10^{-19}$ | | | | |
| I | $-0.8052 \times 10^{-23}$ | | | | |

TABLE III

| LENS | | SURFACE RADII (mm) | AXIAL DISTANCE BETWEEN SURFACES (mm) | $N_d$ | $V_d$ |
|---|---|---|---|---|---|
| | S1 | 258.727 | | | |
| L1 | | | 21.700 | 1.491 | 57.2 |
| | S2 | −1207.846 | | | |
| | | | 47.750 | | |
| | S3 | −329.768 | | | |
| L2 | | | 7.400 | 1.673 | 32.17 |
| | S4 | 137.720 | | | |
| | | | 0.740 | | |
| | S5 | 142.596 | | | |
| L3 | | | 30.000 | 1.589 | 61.26 |
| | S6 | −277.752 | | | |
| | | | 0.250 | | |
| | S7 | 133.119 | | | |
| L4 | | | 32.400 | 1.517 | 64.20 |
| | S8 | −253.948 | | | |
| | | | 57.490 | | |
| | S9 | 396.343 | | | |
| L5 | | | 10.00 | 1.491 | 57.2 |
| | S10 | 479.403 | | | |
| | | | 31.400 | | |
| | S11 | −69.734 | | | |
| L6 | | | 4.760 | 1.491 | 57.2 |
| | S12 | Plano | | | |

f/No. = 1.2 CRT Diagonal = 131.8 mm
EFL = 168. mm Magnification = −.0314
Semi-field = 24° Aperture stop is 22.5 mm after S5
Aspheric Surfaces S1, S2, S9, S10

| | S1 | S2 | S9 |
|---|---|---|---|
| D | $-0.2401 \times 10^{-6}$ | $-0.1956 \times 10^{-6}$ | $0.2561 \times 10^{-6}$ |
| E | $-0.2852 \times 10^{-10}$ | $-0.2302 \times 10^{-10}$ | $-0.4838 \times 10^{-10}$ |
| F | $-0.8694 \times 10^{-15}$ | $0.1560 \times 10^{-14}$ | $0.4407 \times 10^{-15}$ |

TABLE III-continued

| | | | |
|---|---|---|---|
| G | $-0.1983 \times 10^{-18}$ | $-0.6804 \times 10^{-18}$ | $0.2616 \times 10^{-17}$ |
| H | $0.4700 \times 10^{-22}$ | $0.1246 \times 10^{-21}$ | $0.1979 \times 10^{-20}$ |
| I | $-0.3071 \times 10^{-26}$ | $-0.8422 \times 10^{-26}$ | $-0.5595 \times 10^{-24}$ |

| | S10 |
|---|---|
| D | $0.4413 \times 10^{-6}$ |
| E | $-0.1366 \times 10^{-9}$ |
| F | $0.1100 \times 10^{-12}$ |
| G | $-0.6114 \times 0^{-16}$ |
| H | $0.2027 \times 10^{-19}$ |
| I | $-0.2456 \times 10^{-23}$ |

TABLE IV

| LENS | | SURFACE RADII (mm) | AXIAL DISTANCE BETWEEN SURFACES (mm) | $N_d$ | $V_d$ |
|---|---|---|---|---|---|
| | S1 | 64.117 | | | |
| L1 | | | 10.000 | 1.491 | 57.2 |
| | S2 | 454.508 | | | |
| | | | 7.933 | | |
| | S3 | −88.724 | | | |
| L2 | | | 6.000 | 1.620 | 36.30 |
| | S4 | 88.724 | | | |
| | | | 2.290 | | |
| | S5 | 133.595 | | | |
| L3 | | | 15.000 | 1.517 | 64.20 |
| | S6 | −81.130 | | | |
| | | | 0.100 | | |
| | S7 | 52.655 | | | |
| L4 | | | 20.000 | 1.517 | 64.20 |
| | S8 | −145.278 | | | |
| | | | 11.189 | | |
| | S9 | −81.119 | | | |
| L5 | | | 6.000 | 1.491 | 57.20 |
| | S10 | −65.972 | | | |
| | | | 29.963 | | |
| | L11 | −35.209 | | | |
| L6 | | | 3.200 | 1.620 | 36.30 |
| | S12 | −125.000 | | | |
| C | | | 7.530 | 1.410 | 60.00 |
| | S13 | Plano | | | |

f/No. = 1.0 CRT Diagonal = 86.5 mm
EFL = 67.5 mm Aperture stop is 11.25 mm after S5
Semi-field = 29°
Aspheric Surfaces S1, S9, S10

| | S1 | S9 | S10 |
|---|---|---|---|
| D | $-0.1074 \times 10^{-5}$ | $0.1299 \times 10^{-5}$ | $0.2701 \times 10^{-5}$ |
| E | $-0.1105 \times 10^{-8}$ | $0.1361 \times 10^{-8}$ | $0.2393 \times 10^{-8}$ |
| F | $0.8360 \times 10^{-12}$ | $0.1851 \times 10^{-11}$ | $0.1398 \times 10^{-11}$ |
| G | $-0.1195 \times 10^{-14}$ | $0.6225 \times 10^{-15}$ | $0.9554 \times 10^{-15}$ |
| H | $0.6780 \times 10^{-18}$ | $-0.3643 \times 10^{-17}$ | $-0.2834 \times 10^{-17}$ |
| I | $-0.2118 \times 10^{-21}$ | $0.1561 \times 10^{-20}$ | $0.1139 \times 10^{-20}$ |

| | Focusing Data | |
|---|---|---|
| EFL (mm) | D10 (mm) | M |
| 67.94 | 29.55 | −.0831 |
| 67.46 | 29.96 | −.0935 |

TABLE V

| LENS | | SURFACE RADII (mm) | AXIAL DISTANCE BETWEEN SURFACES (mm) | $N_d$ | $V_d$ |
|---|---|---|---|---|---|
| | S1 | 76.197 | | | |
| L1 | | | 13.000 | 1.491 | 57.2 |
| | S2 | −472.688 | | | |
| | | | 10.334 | | |
| | S3 | −81.639 | | | |
| L2 | | | 4.000 | 1.620 | 36.30 |
| | S4 | 90.843 | | | |
| | | | 0.066 | | |
| | S5 | 91.468 | | | |
| L3 | | | 21.100 | 1.517 | 64.17 |
| | S6 | −91.468 | | | |

TABLE V-continued

| | | | | | |
|---|---|---|---|---|---|
| | | | 0.130 | | |
| | S7 | 84.108 | | | |
| L4 | | | 19.200 | 1.589 | 61.27 |
| | S8 | −120.724 | | | |
| | | | 12.366 | | |
| | S9 | −80.743 | | | |
| L5 | | | 6.140 | 1.491 | 57.2 |
| | S10 | −105.033 | | | |
| | | | D10 | | |
| | S11 | −40.818 | | | |
| L6 | | | 4.000 | 1.491 | 57.2 |
| | S12 | −44.000 | | | |
| C | | | 3.000 | 1.443 | 50.0 |
| | S13 | Plano | | | |

f/No. = 1.0 CRT Diagonal = 121.6
EFL = 77.2 mm Aperture stop is 6.33 mm after S5
Semi-field = 33°
Aspheric Surfaces S1, S2, S9, S10, S11

| | S1 | S2 | S9 |
|---|---|---|---|
| D | $-0.6915 \times 10^{-6}$ | $-0.3031 \times 10^{-6}$ | $0.3387 \times 10^{-5}$ |
| E | $-0.3240 \times 10^{-9}$ | $-0.1899 \times 10^{-9}$ | $-0.1011 \times 10^{-9}$ |
| F | $-0.1245 \times 10^{-12}$ | $0.0000 \times 10^{-0}$ | $-0.1141 \times 10^{-12}$ |
| G | $-0.3111 \times 10^{-16}$ | $0.0000 \times 10^{-0}$ | $0.1345 \times 10^{-15}$ |
| H | $0.4997 \times 10^{-19}$ | $0.0000 \times 10^{-0}$ | $-0.2782 \times 10^{-18}$ |
| I | $-0.2346 \times 10^{-22}$ | $0.0000 \times 10^{-0}$ | $0.9852 \times 10^{-22}$ |

| | S10 | S11 |
|---|---|---|
| D | $0.3964 \times 10^{-5}$ | $-0.6488 \times 10^{-5}$ |
| E | $0.4331 \times 10^{-9}$ | $0.1265 \times 10^{-7}$ |
| F | $-0.5884 \times 10^{-12}$ | $0.1142 \times 10^{-10}$ |
| G | $0.3546 \times 10^{-15}$ | $0.2181 \times 10^{-14}$ |
| H | $-0.7876 \times 10^{-19}$ | $0.2972 \times 10^{-17}$ |
| I | $-0.6164 \times 10^{-22}$ | $-0.1388 \times 10^{-20}$ |

Focusing Data

| EFL(mm) | D10 (mm) | M |
|---|---|---|
| 78.25 | 34.06 | −.0944 |
| 77.16 | 25.29 | −.1170 |
| 77.95 | 34.40 | −.1000 |

TABLE VI

| LENS | | SURFACE RADII (mm) | AXIAL DISTANCE BETWEEN SURFACES (mm) | $N_d$ | $V_d$ |
|---|---|---|---|---|---|
| | S1 | 89.851 | | | |
| L1 | | | 16.000 | 1.491 | 57.2 |
| | S2 | 452.287 | | | |
| | | | 15.205 | | |
| | S3 | −141.472 | | | |
| L2 | | | 5.000 | 1.620 | 36.30 |
| | S4 | 111.221 | | | |
| | | | 1.200 | | |
| | S5 | 113.348 | | | |
| L3 | | | 32.500 | 1.517 | 64.20 |
| | S6 | −113.348 | | | |
| | | | 0.200 | | |
| | S7 | 84.350 | | | |
| L4 | | | 25.000 | 1.517 | 64.20 |
| | S8 | −1933.295 | | | |
| | | | 21.747 | | |
| | S9 | −205.505 | | | |
| L5 | | | 9.000 | 1.491 | 57.2 |
| | S10 | −112.793 | | | |
| | | | D10 | | |
| | S11 | −57.034 | | | |
| L6 | | | 5.500 | 1.620 | 36.30 |
| | S12 | plano | | | |

f/No. = 1.0
EFL = 105.0
Semi-field = 30°
Aperture stop is 6.50 mm after S5
Aspheric Surfaces S1, S2, S9, S10

| | S1 | S2 | S9 |
|---|---|---|---|
| D | $-0.1719 \times 10^{-6}$ | $0.2117 \times 10^{-6}$ | $0.2250 \times 10^{-6}$ |
| E | $-0.2179 \times 10^{-9}$ | $-0.4171 \times 10^{-10}$ | $0.4005 \times 10^{-9}$ |

TABLE VI-continued

| | | | |
|---|---|---|---|
| F | $0.1418 \times 10^{-12}$ | $0.4646 \times 10^{-13}$ | $-0.3712 \times 10^{-13}$ |
| G | $-0.6286 \times 10^{-16}$ | $0.1583 \times 10^{-16}$ | $0.6671 \times 10^{-16}$ |
| H | $0.1324 \times 10^{-19}$ | $-0.1450 \times 10^{-19}$ | $-0.1314 \times 10^{-19}$ |
| I | $-0.9909 \times 10^{-24}$ | $0.3482 \times 10^{-23}$ | $-0.1611 \times 10^{-23}$ |

| | | Focusing Data | | |
|---|---|---|---|---|
| | S10 | EFL(mm) | D10(mm) | M |
| D | $0.7114 \times 10^{-6}$ | | | |
| E | $0.4129 \times 10^{-9}$ | 105.0 | 40.52 | −.135 |
| F | $0.6262 \times 10^{-14}$ | 106.3 | 39.53 | −.120 |
| G | $0.1164 \times 10^{-16}$ | 107.2 | 38.83 | −.108 |
| H | $0.3025 \times 10^{-19}$ | | | |
| I | $-0.9399 \times 10^{-23}$ | | | |

TABLE VII

| LENS | | SURFACE RADII (mm) | AXIAL DISTANCE BETWEEN SURFACES (mm) | $N_d$ | $V_d$ |
|---|---|---|---|---|---|
| | S1 | 90.401 | | | |
| L1 | | | 17.00 | 1.491 | 5.72 |
| | S2 | 551.710 | | | |
| | | | 15.937 | | |
| | S3 | −148.320 | | | |
| L2 | | | 6.000 | 1.620 | 36.4 |
| | S4 | 100.990 | | | |
| | | | 0.300 | | |
| | S5 | 102.822 | | | |
| L3 | | | 30.000 | 1.517 | 64.2 |
| | S6 | −134.365 | | | |
| | | | 0.200 | | |
| | S7 | 85.085 | | | |
| L4 | | | 24.500 | 1.517 | 64.2 |
| | S8 | −309.659 | | | |
| | | | 25.369 | | |
| | S9 | −155.451 | | | |
| L5 | | | 9.000 | 1.491 | 57.2 |
| | S10 | −112.107 | | | |
| | | | D10 | | |
| | S11 | −57.391 | | | |
| L6 | | | 4.000 | 1.620 | 36.4 |
| | S12 | plano | | | |

f/No. = 1.2 CRT Deagonal - 122 mm
EFL = 104.7 mm Aperture stop is 9.90 mm after S5
Semi-field = 28°
Aspheric Surfaces S1, S2, S9, S10

| | S1 | S2 | S9 |
|---|---|---|---|
| D | $-0.2355 \times 10^{-6}$ | $0.1469 \times 10^{-6}$ | $0.2639 \times 10^{-6}$ |
| E | $-0.1505 \times 10^{-9}$ | $-0.1695 \times 10^{-10}$ | $0.4973 \times 10^{-9}$ |
| F | $0.7536 \times 10^{-13}$ | $0.3153 \times 10^{-13}$ | $-0.8879 \times 10^{-13}$ |
| G | $-0.3857 \times 10^{-16}$ | $0.5873 \times 10^{-17}$ | $0.4487 \times 10^{-16}$ |
| H | $0.9174 \times 10^{-20}$ | $-0.7355 \times 10^{-20}$ | $-0.1095 \times 10^{-19}$ |
| I | $-0.1059 \times 10^{-23}$ | $0.1920 \times 10^{-23}$ | $-0.1734 \times 10^{-23}$ |
| K | 1.326 | | |

| | | Focusing Data | | |
|---|---|---|---|---|
| | S10 | EFL (mm) | D10 (mm) | M |
| D | $0.8827 \times 10^{-6}$ | | | |
| E | $0.4826 \times 10^{-9}$ | 104.8 | 36.40 | −.110 |
| F | $0.6637 \times 10^{-14}$ | 105.7 | 35.55 | −.097 |
| G | $-0.8763 \times 10^{-17}$ | 103.6 | 37.30 | −.123 |
| H | $0.2104 \times 10^{-19}$ | | | |
| I | $-0.6838 \times 10^{-23}$ | | | |

TABLE VIII

| LENS | | SURFACE RADII (mm) | AXIAL DISTANCE BETWEEN SURFACES (mm) | $N_d$ | $V_d$ |
|---|---|---|---|---|---|
| | S1 | 79.527 | | | |
| L1 | | | 14.000 | 1.491 | 57.2 |
| | S2 | 380.482 | | | |
| | | | 14.450 | | |
| | S3 | −116.430 | | | |
| L2 | | | 4.500 | 1.620 | 36.4 |

TABLE VIII-continued

| | | | | | |
|---|---|---|---|---|---|
| | S4 | 93.704 | | | |
| | | | 0.10 | | |
| | S5 | 93.126 | | | |
| L3 | | | 31.000 | 1.517 | 64.2 |
| | S6 | −93.126 | | | |
| | | | 0.200 | | |
| | S7 | 73.005 | | | |
| L4 | | | 20.000 | 1.517 | 64.2 |
| | S8 | −7708.286 | | | |
| | | | 16.870 | | |
| | S9 | −94.045 | | | |
| L5 | | | 8.000 | 1.491 | 57.2 |
| | S10 | −83.071 | | | |
| | | | D10 | | |
| | S11 | −53.241 | | | |
| L6 | | | 5.75 | 1.620 | 36.4 |
| | S12 | −130.000 | | | |
| C | | | 8.000 | 1.435 | 50.0 |
| | S13 | plano | | | |

f/No. = 1.2 CRT Diagonal = 128.6 mm
EFL = 96.9 Aperture stop is 6.20 mm after S5
Semi-field = 29°
Aspheric Surfaces S1, S2, S9, S10

| | S1 | S2 | S9 |
|---|---|---|---|
| D | $-0.2013 \times 10^{-6}$ | $0.2863 \times 10^{-6}$ | $0.9194 \times 10^{-6}$ |
| E | $-0.4457 \times 10^{-9}$ | $-0.1806 \times 10^{-9}$ | $0.9549 \times 10^{-9}$ |
| F | $0.3147 \times 10^{-12}$ | $0.1593 \times 10^{-12}$ | $-0.2721 \times 10^{-12}$ |
| G | $-0.1513 \times 10^{-15}$ | $0.4444 \times 10^{-16}$ | $0.1107 \times 10^{-15}$ |
| H | $0.3487 \times 10^{-19}$ | $-0.6001 \times 10^{-19}$ | $-0.4843 \times 10^{-19}$ |
| I | $-0.2575 \times 10^{-23}$ | $0.1777 \times 10^{-22}$ | $0.5510 \times 10^{-23}$ |
| K | 1.326 | | |

| | | Focusing Data | | |
|---|---|---|---|---|
| | S10 | EFL (mm) | D10 (mm) | M |
| D | $0.1532 \times 10^{-5}$ | | | |
| E | $0.8778 \times 10^{-9}$ | 96.87 | 45.21 | −.109 |
| F | $0.3840 \times 10^{-14}$ | 95.96 | 46.12 | −.123 |
| G | $-0.9903 \times 10^{-16}$ | 98.07 | 44.05 | −.092 |
| H | $0.6608 \times 10^{-19}$ | | | |
| I | $-0.1801 \times 10^{-22}$ | | | |

TABLE IX

| LENS | | SURFACE RADII (mm) | AXIAL DISTANCE BETWEEN SURFACES (mm) | $N_d$ | $V_d$ |
|---|---|---|---|---|---|
| | S1 | 178.554 | | | |
| L1 | | | 13.000 | 1.491 | 57.2 |
| | S2 | 2078.521 | | | |
| | | | D2 | | |
| | S3 | −255.343 | | | |
| L2 | | | 5.890 | 1.689 | 31.2 |
| | S4 | 123.551 | | | |
| | | | 1.030 | | |
| | S5 | 131.041 | | | |
| L3 | | | 28.640 | 1.589 | 61.3 |
| | S6 | −177.989 | | | |
| | | | 0.200 | | |
| | S7 | 109.648 | | | |
| L4 | | | 30.280 | 1.517 | 64.2 |
| | S8 | −205.352 | | | |
| | | | 0.210 | | |
| | S9 | 100.488 | | | |
| L5 | | | 8.830 | 1.491 | 57.2 |
| | S10 | 92.312 | | | |
| | | | 70.634 | | |
| | S11 | −50.216 | | | |
| L6 | | | 4.000 | 1.491 | 57.2 |
| | S12 | −368.024 | | | |
| | | | D12 | | |
| | S13 | Plano | | | |

f/No. = 1.1 CRT Diagonal = 124 mm
EFL = 134.3 mm Aperture stop is 0.00 mm after S5
Semi-field = 23°
Aspheric Surfaces S1, S2, S9, S10, S11, S12

TABLE IX-continued

| | S1 | S2 | S9 |
|---|---|---|---|
| D | $-0.1388 \times 10^{-6}$ | $0.6584 \times 10^{-8}$ | $0.3096 \times 10^{-6}$ |
| E | $0.2185 \times 10^{-10}$ | $-0.3880 \times 10^{-11}$ | $0.1208 \times 10^{-9}$ |
| F | $-0.9592 \times 10^{-15}$ | $-0.1779 \times 10^{-14}$ | $-0.9276 \times 10^{-13}$ |
| G | $-0.3269 \times 10^{-18}$ | $-0.3821 \times 10^{-18}$ | $0.3919 \times 10^{-16}$ |
| H | $-0.1475 \times 10^{-21}$ | $-0.4385 \times 10^{-22}$ | $-0.1022 \times 10^{-19}$ |
| I | $0.2055 \times 10^{-25}$ | $0.7238 \times 10^{-26}$ | $0.3230 \times 10^{-24}$ |

| | S10 | S11 | S12 |
|---|---|---|---|
| D | $0.4304 \times 10^{-6}$ | $0.1151 \times 10^{-6}$ | $0.8256 \times 10^{-7}$ |
| E | $-0.1594 \times 10^{-10}$ | $0.6788 \times 10^{-10}$ | $-0.1621 \times 10^{-9}$ |
| F | $0.1444 \times 10^{-12}$ | $0.4601 \times 10^{-13}$ | $0.1331 \times 10^{-12}$ |
| G | $-0.1501 \times 10^{-15}$ | $0.7941 \times 10^{-16}$ | $-0.5933 \times 10^{-16}$ |
| H | $0.6239 \times 10^{-19}$ | $-0.4504 \times 10^{-19}$ | $0.1571 \times 10^{-19}$ |
| I | $-0.1204 \times 10^{-22}$ | $0.8758 \times 10^{-23}$ | $-0.1980 \times 10^{-23}$ |

Focusing Data

| EFL (mm) | D2 (mm) | D12 (mm) | M |
|---|---|---|---|
| 135.05 | 50.38 | 11.31 | −.1000 |
| 134.33 | 46.44 | 4.99 | −.0500 |
| 133.74 | 43.38 | 0.86 | −.0167 |

TABLE X

| LENS | | SURFACE RADII (mm) | AXIAL DISTANCE BETWEEN DISTANCES (mm) | $N_d$ | $V_d$ |
|---|---|---|---|---|---|
| | S1 | 184.313 | | | |
| L1 | | | 17.300 | 1.491 | 57.2 |
| | S2 | −4893.612 | | | |
| | | | D2 | | |
| | S3 | −255.343 | | | |
| L2 | | | 5.890 | 1.689 | 31.16 |
| | S4 | 123.551 | | | |
| | | | 1.030 | | |
| | S5 | 131.041 | | | |
| L3 | | | 28.640 | 1.589 | 61.25 |
| | S6 | −177.989 | | | |
| | | | 0.200 | | |
| | S7 | 109.648 | | | |
| L4 | | | 30.280 | 1.517 | 64.2 |
| | S8 | −205.352 | | | |
| | | | 6.260 | | |
| | S9 | 78.134 | | | |
| L5 | | | 10.000 | 1.491 | 57.2 |
| | S10 | 67.389 | | | |
| | | | 60.210 | | |
| | S11 | −48.859 | | | |
| L6 | | | 4.000 | 1.491 | 57.2 |
| | S12 | −252.989 | | | |
| | | | 1.302 | | |
| | S13 | Plano | | | |
| | | | D12 | | |

f/No. = 1.1 CRT Diagonal = 124 mm
EFL = 135.7 mm Aperture stop is 0.00 mm after S5
Semi-field = 23°
Aspheric Surfaces S1, S2, S9, S10, S11, S12

| | S1 | S2 | S9 |
|---|---|---|---|
| D | $-0.2911 \times 10^{-6}$ | $-0.1945 \times 10^{-6}$ | $-0.3015 \times 10^{-7}$ |
| E | $-0.7792 \times 10^{-10}$ | $-0.5934 \times 10^{-10}$ | $0.8356 \times 10^{-10}$ |
| F | $0.7366 \times 10^{-14}$ | $0.7111 \times 10^{-14}$ | $-0.1079 \times 10^{-12}$ |
| G | $-0.4384 \times 10^{-17}$ | $-0.3414 \times 10^{-17}$ | $0.4778 \times 10^{-16}$ |
| H | $0.7916 \times 10^{-21}$ | $0.7097 \times 10^{-21}$ | $-0.1167 \times 10^{-19}$ |
| I | $-0.3500 \times 10^{-25}$ | $-0.4415 \times 10^{-25}$ | $-0.8726 \times 10^{-25}$ |

| | S10 | S11 | S12 |
|---|---|---|---|
| D | $0.2618 \times 10^{-7}$ | $0.1161 \times 10^{-5}$ | $0.7359 \times 10^{-6}$ |
| E | $-0.3268 \times 10^{-10}$ | $-0.6628 \times 10^{-9}$ | $-0.5860 \times 10^{-9}$ |
| F | $0.9906 \times 10^{-13}$ | $0.4292 \times 10^{-12}$ | $0.2597 \times 10^{-12}$ |
| G | $-0.1459 \times 10^{-15}$ | $0.9961 \times 10^{-17}$ | $-0.4923 \times 10^{-16}$ |
| H | $0.7475 \times 10^{-19}$ | $-0.5969 \times 10^{-19}$ | $0.1168 \times 10^{-23}$ |
| I | $-0.1894 \times 10^{-22}$ | $0.1511 \times 10^{-22}$ | $0.6336 \times 10^{-24}$ |

Focusing Data

| EFL (mm) | D2 (mm) | D12 (mm) | M |
|---|---|---|---|
| 135.71 | 48.71 | 11.73 | −.1000 |
| 134.97 | 44.80 | 5.42 | −.0500 |

TABLE X-continued

| | | | |
|---|---|---|---|
| 134.36 | 41.50 | 1.30 | −.0167 |

TABLE XI

| LENS | | SURFACE RADII (mm) | AXIAL DISTANCE BETWEEN SURFACES (mm) | $N_d$ | $V_d$ |
|---|---|---|---|---|---|
| | S1 | 166.333 | | | |
| L1 | | | 9.000 | 1.491 | 57.2 |
| | S2 | −14321.009 | | | |
| | | | 20.1000 | | |
| | S3 | −600.536 | | | |
| L2 | | | 6.000 | 1.785 | 25.7 |
| | S4 | 132.672 | | | |
| | | | 0.080 | | |
| | S5 | 134.262 | | | |
| L3 | | | 15.350 | 1.589 | 61.3 |
| | S6 | −132.733 | | | |
| | | | 0.200 | | |
| | S7 | 171.218 | | | |
| L4 | | | 7.000 | 1.491 | 57.2 |
| | S8 | 100.514 | | | |
| | | | 1.200 | | |
| | S9 | 111.209 | | | |
| L5 | | | 19.450 | 1.589 | 61.3 |
| | S10 | −142.661 | | | |
| | | | 55.750 | | |
| | S11 | −68.468 | | | |
| L6 | | | 4.000 | 1.491 | 57.2 |
| | S12 | 269.671 | | | |

f/No. = 1.4 CRT Diagonal = 125.8 mm
EFL = 111.6 Magnification = .0263
Semi-field = 34° Aperture stop is 5.05 mm after S5
Aspheric Surfaces S1, S2, S7, S8, S11, S12

| | S1 | S2 | S7 |
|---|---|---|---|
| D | $-0.9964 \times 10^{-6}$ | $-0.3034 \times 10^{-6}$ | $0.6027 \times 10^{-6}$ |
| E | $-0.4344 \times 10^{-9}$ | $-0.3497 \times 10^{-9}$ | $-0.1651 \times 10^{-10}$ |
| F | $-0.1037 \times 10^{-12}$ | $-0.3718 \times 10^{-13}$ | $0.5166 \times 10^{-14}$ |
| G | $0.1695 \times 10^{-16}$ | $-0.1261 \times 10^{-16}$ | $-0.6497 \times 10^{-17}$ |
| H | $0.1831 \times 10^{-19}$ | $0.2801 \times 10^{-19}$ | $0.6405 \times 10^{-21}$ |
| I | $0.2021 \times 10^{-23}$ | $-0.1241 \times 10^{-23}$ | $-0.7613 \times 10^{-24}$ |

| | S8 | S11 | S12 |
|---|---|---|---|
| D | $0.1130 \times 10^{-6}$ | $-0.3187 \times 10^{-5}$ | $-0.8632 \times 10^{-6}$ |
| E | $0.3713 \times 10^{-12}$ | $0.2489 \times 10^{-9}$ | $0.1616 \times 10^{-9}$ |
| F | $-0.1677 \times 10^{-13}$ | $-0.2606 \times 10^{-12}$ | $-0.1755 \times 10^{-13}$ |
| G | $-0.8127 \times 10^{-18}$ | $0.1321 \times 10^{-15}$ | $0.2955 \times 10^{-17}$ |
| H | $0.6405 \times 10^{-21}$ | $0.7036 \times 10^{-19}$ | $0.1630 \times 10^{-21}$ |
| I | $-0.9106 \times 10^{-24}$ | $-0.4831 \times 10^{-22}$ | $-0.1388 \times 10^{-24}$ |

Table XII sets forth the powers $K_{G1}$, $K_{G2}$, $K_{G3}$, and $K_{CR}$ of the lens units of each of the examples as a ratio of the power of the overall lens.

TABLE XII

| TABLE | $K_{G1}/K_O$ | $K_{G2}/K_O$ | $K_{G3}/K_O$ | $K_{CR}/K_O$ |
|---|---|---|---|---|
| I | .373 | .949 | −1.032 | −.068 |
| II | .392 | 1.000 | −1.149 | −.203 |
| III | .387 | .948 | −1.189 | .124 |
| IV | .452 | .838 | −1.021 | −.011 |
| V | .574 | .838 | −.838 | −.108 |
| VI | .479 | .755 | −.838 | −.212 |
| VII | .488 | .803 | −1.080 | .139 |
| VIII | .478 | .789 | −.975 | .083 |
| IX | .340 | 1.000 | −1.149 | −.004 |
| X | .377 | .947 | −1.099 | −.095 |
| XI | .355 | 1.009 | −1.013 | −.— |

It will be seen that the corrector element CR has little optical power. Its primary purpose is to provide aspheric surfaces for correction of aberrations.

In all embodiments, except that of Table XI, all elements of lens unit G2 are glass with spherical surfaces, and thus avoid focus drift with temperature.

In the examples of Tables IV–VIII the optical power of the first lens unit $K_1/K_0$ is greater than 0.4. This is permissable in view of the spacing $D_{12}/F_0$ which is less than 0.2. Thus the spacing $D_{12}/F_0$ will be a function of the axial optical power of the first lens unit. The lesser the optical power of the first lens unit, the greater the spacing $D_{12}/F_0$ may be.

The optical power of the doublet consisting of L2 and L3 is all embodiments is very weak.

The axial spacing between L3 and the power element L4 is very small, less than one tenth of one per cent of the EFL of the lens.

The power of the corrector element CR as a ratio to the power of the lens is weak and $$0.1 > |K_{CR}/K_0| 0.3$$

Thus any change in index of refraction of the corrector element due to temperature does not adversly affect the focus of the lens.

Table XIII sets forth the spacing of element L1 and L2, $D_{12}/F_0$, and also the spacing of the corrector element from the second lens unit $D_{2C}/F_0$, together with the ratio of the powers of L2 and L3 to the power of the lens.

TABLE XIII

| TABLE | $D_{12}/F_0$ | $D_{2C}/F_0$ | $K_{L2}/K_0$ | $K_{L3}/K_0$ |
|---|---|---|---|---|
| I | .294 | .245 | −1.190 | 1.036 |
| II | .314 | .397 | −1.133 | 1.022 |
| III | .284 | .342 | −1.180 | 1.027 |
| IV | .117 | .166 | −.962 | .677 |
| V | .134 | .160 | −.962 | .677 |
| VI | .148 | .207 | −.990 | .863 |
| VII | .151 | .242 | −1.031 | .838 |
| VIII | .147 | .175 | 1.127 | .977 |
| IX | .321 | −.— | −1.127 | 1.016 |
| X | .302 | .050 | −1.133 | 1.021 |
| XI | .181 | −.13 | −.817 | .968 |

The color correcting doublet of the second lens unit is designed to provide the necessary color correction without introducing uncorrectable aberrations. The lenses of Tables I, II, II, VII and VIII provide modulation transfer functions of ten cycles/millimeter over most of the field. In these examples, the absolute optical power of the biconcave element L2 and the first biconvex element L3 are greater than the optical power of the overall lens.

The lens of Table XI provides an MTF of 6.3 cycles/-millimeter and the embodiments of Tables IV-VIII provide 5.0 cycles/millimeter.

The lens of Table XI and FIG. 4 utilizes a two element power component L4 and L5 where L4 is acrylic and has two aspheric surfaces, and has an axial power which is about 21% of L5. The EFL's of the lenses as set forth in the prescriptions may vary as the lens is focused for various projection distances and magnifications.

The lenses of Tables I and III are designed for front projection at predetermined distances and provide image/object magnifications of 16.4× and 31.8× respectively.

The lens of Table II is also designed for front projection and has a range of magnifications 10× to 60×. To focus for varying image distances elements L1-L5 move in the same direction with the corrector L5 moving differentially to correct for aberrations introduced by movement of lens units G1 and G2. In FIG. 1, the focusing movement of elements L1-L4 is shown by the arrow F and the focusing movement of element L5 is shown by the arrow $F_D$.

The lenses of Tables IX and X are also designed and have magnifications of 10× to 60×. Here elements L1–L5 move axially for focusing with L1 moving differentially at a lesser rate. This differential movement corrects for aberrations introduced by the focusing movement of elements L1–L5. In FIG. 3, the focusing movement of elements L2–L5 is shown by the arrow F while the differential movement of element L1 is shown by the arrow $F_D$.

The lenses of Table IV–VIII are designed for rear projection and in some cases are provided with focusing capability dependent on the magnification required for the size of the viewing screen. That is, the same lens may be used for a forty or fifty inch diagonal viewing screen.

The lens of Table XI does not use a corrector element CR as shown in the other embodiments, but does include a weak meniscus L4 having two aspheric surfaces as a part of the second lens unit G2.

It may thus be seen that the objects of the invention set forth as well as those made apparent from the foregoing description are efficiently attained. While preferred embodiments of the invention have been set forth for purposes of disclosure, modification of the disclosed embodiments of the invention as well as other embodiments thereof may occur to those skilled in the art. Accordingly, the appended claims are intended to cover all of the embodiments of the invention and modifications to the disclosed embodiments which do not depart from the spirit and scope of the invention.

Having described the invention, what is claimed is:

1. A projection lens for use in combination with a cathode ray tube where the projection lens is closely coupled to the cathode ray tube, said lens comprising from the image end a first lens unit of positive optical power having at least one aspheric surface and contributing to correction of aperture dependent aberrations, a second lens unit providing a majority of the positive power of said lens, and a third lens unit having a strongly concave image side surface which provides correction for field curvature and Petzval sum of other units of said lens, said second lens unit consisting from the image end of a biconcave element, a biconvex element and a positive component, said biconcave element and said biconvex element forming a color correcting doublet and being of overall meniscus shape concave to the image end, said color correcting doublet being axially spaced from said positive component a distance less than 0.01 of the equivalent focal length of said lens.

2. The lens of claim 1 where said doublet is axially spaced from said first lens unit at least 0.1 of the equivalent focal length of said lens.

3. The lens of claim 1 further including a corrector lens unit of weak optical power having two aspheric surfaces positioned between said second and third lens units, said corrector lens unit being axially spaced from said second lens unit a distance $$0.4 > D_{2C}/F_O > 0.15$$

where $D_{2C}$ is the axial spacing distance between said second lens unit and said corrector element and $F_0$ is the equivalent focal length of said lens.

4. The lens of claim 3 where said lens has a variable magnification, said first and said second lens units move axially in fixed relation to focus said lens and said corrector lens unit moves axially in the same direction but at a differential rate.

5. The lens of claim 3 where said element of said first lens unit has two aspheric surfaces.

6. The lens of claim 3 where the axial marginal rays traced from the long conjugate intersect a surface of said corrector lens unit substantially below the clear aperture of said image side surface.

7. The lens of claim 1 where said element of said first lens unit has two aspheric surfaces.

8. The lens of claim 1 where said first and second lens units move axially in the same direction at differential rates to vary the focus of said lens.

9. The lens of claim 8 where the axial spacing between said first lens unit and said second lens unit is $$0.4 > D_{12}/F_0 > 0.1$$

where $D_{12}$ is the distance between the first and second lens units and $F_0$ is the equivalent focal length of said lens.

10. The lens of claim 1 where said positive lens component is also biconvex.

11. The lens of claim 1 where all elements of said second lens unit have spherical surfaces.

12. The lens of claim 1 wherein said corrector lens has two aspheric surfaces, said corrector lens unit being axially spaced from said second lens unit a distance $$0.4 > D_{2C}/F_0 > 0.15$$

where $D_{2C}$ is the axial distance between said biconvex element and said biconvex lens and $F_0$ is the equivalent foal length of said lens.

13. A projection lens for use in combination with a cathode ray tube where the projection lens is closely coupled to the cathode ray tube, said lens comprising from the image end a first lens unit of positive optical power having at least one aspheric surface and contributing to correction of aperture dependent aberrations, a second lens unit providing a majority of the positive power of said lens, and a third lens unit having a strongly concave image side surface which provides correction for field curvature and Petzval sum of other units of said lens, said second lens unit consisting from the image end of a biconcave element, a biconvex element and a positive component, said biconcave element and said first biconvex element forming a color correcting doublet and being of overall meniscus shape concave to the image end, said positive component comprising two elements, one of said elements of said positive component having two aspheric surfaces and being of meniscus shape.

14. The lens of claim 13 where said doublet is spaced from said first lens unit at least 0.1 of the focal length of said lens.

15. A projection lens for use in combination with a cathode ray tube where the projection lens is closely coupled to the cathode ray tube, said lens comprising from the image end a first lens unit of positive optical power having at least one aspheric surface and contributing to correction of aperture dependent aberrations, said first lens unit consisting of a single element, a second lens unit providing a majority of the positive power of said lens, and a third lens unit having a strongly concave image side surface which provides correction for field curvature and Petzval sum of other units of said lens, said second lens unit comprising from the image end a biconcave element, a biconvex element and a positive element, said biconcave element and said biconvex element forming a color correcting doublet and being of overall meniscus shape concave to the image end, and a corrector lens unit of weak optical power having at least one aspheric surface positioned between said second and third lens units, said corrector lens unit being axially spaced from said second lens unit a distance $$0.4 > D_{2C}/F_0 > 0.15$$

where $D_{2C}$ is the axial spacing distance between said second lens unit and said corrector element and F0 is the equivalent focal length of said lens.

16. The lens of claim 15 where said element of said first lens unit has two aspheric surfaces.

17. The lens of claim 15 where said lens has a variable magnification, said first and said second lens units move axially in fixed relation to focus said lens and said corrector lens element moves axially in the same direction but at a differential rate.

18. The lens of claim 15 where said first and second lens units move axially in the same direction at differential rates to vary the focus of said lens.

19. The lens of claim 15 where said positive element is also biconvex.

20. The lens of claim 15 where all elements of said second lens unit have spherical surfaces.

21. The lens of claim 15 where the axial marginal rays traced from the long conjugate intersect the image side surface of said corrector lens unit substantially below the clear aperture of said image side surface.

22. A projection lens for use in combination with a cathode ray tube where the projection lens is closely coupled to the cathode ray tube, said lens comprising from the image end a first lens unit of postive optical power having at least one aspheric surface and contributing to correction of aperture dependent aberrations, a second lens unit providing a majority of the positive power of said lens, and a third lens unit having a strongly concave image side surface which provides correction for field curvature and Petzval sum of the other units of said lens, said second lens unit comprising from the image end a biconcave element, a biconvex element and a positive lens element, said biconcave element and said biconvex element forming a color correcting doublet and being of overall meniscus shape concave to the image end, a corrector lens unit positioned between said second and third lens units, said lens having a variable focus and said first lens unit, said second lens unit, and said corrector lens unit being movable axially in the same direction to change the focus of said lens, one of said first lens unit and said corrector lens unit moving differentially with respect to the other movable lens units.

23. The lens of claim 22 where said biconcave element has an absolute optical power greater than the power of said lens.

24. The lens of claim 22 where said first lens unit consists of a single element having two aspheric surfaces.

25. The lens of claim 22 where the axial spacing between said first lens unit and said second lens unit is $$0.4 > D_{12}/F_0 > 0.1$$

where $D_{12}$ is the distance between the first and second lens units and $F_0$ is the equivalent focal length of said lens.

26. The lens of claim 22 where said positive component is also biconvex.

27. The lens of claim 22 where all elements of said second lens unit have spherical surfaces.

28. The lens of claim 22 where said first lens unit moves differentially.

29. The lens of claim 22 where said corrector lens unit moves differentially.

30. A projection lens for use in combination with a cathode ray tube where the projection lens is closely coupled to the cathode ray tube, said lens comprising from the image end a first lens unit of positive optical power having at least one aspheric surface and contributing to correction of aperture dependent aberrations, a second lens unit providing a majority of the positive power of said lens, and a third lens unit having a strongly concave image side surface which provides correction for field curvature and Petzval sum of other units of said lens, said second lens unit comprising from the image end a biconcave element, a biconvex element and a positive element, said biconcave element and said biconvex element forming a color correcting doublet and being of overall meniscus shape concave to the image end, and a corrector lens unit of weak optical power having at least one aspheric surface positioned between said second and third lens units, said corrector lens unit being axially spaced from said second lens unit a distance $$0.4 > D_{2C}/F_0 > 0.15$$

where $D_{2C}$ is the axial spacing distance between said second lens unit and said corrector element and $F_0$ is the equivalent focal length of said lens.

31. The lens of claim 30 where said first lens unit consists of a single element having two aspheric surfaces.

32. The lens of claim 30 where said positive element is also biconvex.

33. The lens of claim 30 where all elements of said second lens unit have spherical surfaces.

34. A projection lens for use in combination with a cathode ray tube where the projection lens is closely coupled to the cathode ray tube, said lens comprising from the image end a first lens unit of weak optical power having at least one aspheric surface and contributing to correction of aperture dependent aberrations, a second lens unit providing a majority of the positive power of said lens, said second lens unit being spaced from said first lens unit at least 0.1 of the equivalent focal length of the lens, and a third lens unit having a strongly concave image side surface which provides correction for field curvature and Petzval sum of other units of said lens, said second lens unit comprising from the image end a biconcave element, a biconvex element and a positive element, said biconcave element and said biconvex element forming a color correcting doublet and being of overall meniscus shape concave to the image end, and a corrector lens unit of weak optical power positioned between said second and third lens, said corrector lens unit having at least one aspheric surface, the configuration and the positioning of said corrector lens element from said second lens unit being such that the axial marginal rays from said second lens unit as traced from the long conjugate intersect a surface of said corrector lens unit at a height H from the optical axis of said lens that is less than the clear aperture of said surface of said corrector lens unit, said corrector lens surface being configured to contribute to correction of aperture dependent aberrations within said height H, said surface of said corrector lens beyond said height H being configured to contribute to correction of aberrations due to off-axis rays.

35. The lens of claim 34 wherein said positive element of said second lens unit is biconvex.

36. The lens of claim 34 where said corrector lens unit consists of a single element.

37. The lens of claim 34 where all elements of said second lens unit have spherical surfaces.

38. A projection lens for use in combination with a cathode ray tube where the projection lens is closely coupled to the cathode ray tube, said lens comprising from the image end a first lens unit of positive optical power having at least one aspheric surface and contributing to correction of aperture dependent aberrations, said first lens unit comprising a front meniscus element convex toward the image end, a second lens unit providing a majority of the positive power of said lens, said second lens unit being spaced from said meniscus element at least 0.1 of the equivalent focal length of the lens, and a third lens unit having a strongly concave image side surface which provides correction for field curvature and Petzval sum of other units of said lens, said second lens unit consisting from the image end of a biconcave element, a biconvex element and a positive element, said biconcave element and said biconvex element forming a color correcting doublet and being of overall meniscus shape concave to the image end, and a corrector lens unit of weak optical power positioned between said second and third lens, the configuration and the positioning of said corrector lens element from said second lens unit being such that the axial marginal rays from said second lens unit as traced from the long conjugate intersect a surface of said corrector lens unit at a height H from the optical axis of said lens that is less than the clear aperture of said surface of said corrector lens unit, said corrector lens surface being configured to contribute to correction of aperture dependent aberrations within said height H, said surface of said corrector lens beyond said height H being configured to contribute to correction of aberrations due to off-axis rays.

39. The lens of claim 38 wherein said positive element of said second lens unit is biconvex.

40. The lens of claim 38 where said corrector lens unit consists of a single element.

41. A projection lens for use in combination with a cathode ray tube where the projection lens is closely coupled to the cathode ray tube, said lens comprising from the image end a first lens unit of weak positive optical power having at least one aspheric surface and contributing to correction of aperture dependent aberrations, a second lens unit providing a majority of the positive power of said lens, and a third lens unit having a strongly concave image side surface which provides correction for field curvature and Petzval sum of other units of said lens, said second lens unit comprising from the image end a biconcave element, a biconvex element and a positive element, said biconcave element and said biconvex element forming a color correcting doublet and being of overall meniscus shape concave to the image end, and a corrector lens unit of weak optical power positioned between said second and third lens, the configuration and the positioning of said corrector lens unit from said second lens unit being such that the axial marginal rays from said second lens unit as traced from the long conjugate intersect a surface of said corrector lens unit at a height H from the optical axis of said lens that is less than the clear aperture of said surface of said corrector lens unit, said corrector lens surface being configured to contribute to correction of aperture dependent aberrations within said height H, said surface of said corrector lens beyond said height H being configured to contribute to correction of aberrations due to off-axis rays.

42. The lens of claim 41 wherein said positive element of said second lens unit is biconvex.

43. The lens of claim 41 where said corrector lens unit consists of a single element.

44. The lens of claim 41 where said biconcave element has an absolute optical power greater than the power of said lens and said biconvex element has an optical power greater than the optical power of said lens.

45. The lens of claim 41 where said biconcave element has an absolute optical power greater than the power of said lens.

46. The lens of claim 41 where all elements of said second lens unit have spherical surfaces.

47. The lens of claim 41 where said color correcting doublet is of weak negative optical power.

48. The lens of claim 41 where the absolute optical power of said biconcave element is greater than the optical power of said biconvex element.

49. The lens of claim 41 where said lens has a variable magnification, said first and said second lens units move axially in fixed relation to focus said lens and said corrector lens element moves axially in the same direction but at a differential rate.

50. The lens of claim 41 where said first and second lens units move axially in the same direction at differential rates to vary the focus of said lens.

51. A projection lens system for use in combination with a cathode ray tube comprising:

(a) a first lens at the image end of said lens system wherein the surface of said first lens on the image side is convex to the image on the axis of said first lens and is concave to the image at and near the clear aperture of said first lens and the other surface of said first lens is concave to the image;

(b) a second lens adapted to be closely coupled to a cathode ray tube, said second lens having a concave image side surface;

(c) a color correcting doublet located between said first and second lenses, said color correcting doublet being comprised of a biconcave lens and a biconvex lens;

(d) a biconvex lens located between said color correcting doublet and said second lens; and (e) a corrector lens located between said biconvex lens and said second lens, said corrector lens being shaped and positioned to contribute to correction of spherical aberrations in the central portion thereof and to contribute to the correction of aberrations due to off axis rays beyond said central portion.

52. The lens of claim 51 where both elements of said color correcting doublet and said biconvex lens are glass having spheric surfaces.

53. The lens of claim 51 where said color correcting doublet is of weak negative optical power.

54. The lens of claim 51 where said doublet is spaced from said first lens unit at least 0.1 of the equivalent focal length of said lens.

55. The lens of claim 51 where said first lens has two aspheric surfaces.

56. The lens of claim 51 where said color correcting doublet is axially spaced from said biconvex element no more than 0.01 of the equivalent focal length of said lens.

57. The lens of claim 51 where said doublet is concave to the images.

58. A projection lens system for use in combination with a cathode ray tube comprising (a) a first lens at the image end of said lens system wherein the surface of said first lens on the image side is convex to the image on the axis of said first lens and is concave to the image at and near the clear aperture of said first lens and the other surface of said first lens is concave to the image;

(b) a second lens adapted to be closely coupled to the cathode ray tube, said second lens having a concave image side aspheric surface;

(c) a color correcting doublet located between said first and second lenses, the color correcting doublet being comprised of a biconcave lens and a biconvex lens;

(d) a biconvex lens located between said color correcting doublet and said biconvex lens; and (e) a meniscus lens convex to the image located between said doublet and said biconvex lens.

59. The lens system of claim 58 wherein both surfaces of said second lens are aspheric.

* * * * *